United States Patent [19]

Jakubauskas

[11] 3,980,602

[45] Sept. 14, 1976

[54] ACRYLIC POLYMER DISPERSANT FOR AQUEOUS ACRYLIC COATING COMPOSITIONS

[75] Inventor: Henry L. Jakubauskas, Chadds Ford, Pa.

[73] Assignee: E. I. Du Pont de Nemours and Company, Wilmington, Del.

[22] Filed: Feb. 28, 1975

[21] Appl. No.: 554,225

[52] U.S. Cl.......................... 260/29.6 TA; 106/304; 106/308 Q; 260/29.6 T
[51] Int. Cl.² ............................................ C08F 1/13
[58] Field of Search ........... 106/308 Q, 308 M, 304; 260/29.6 T, 29.6 TA

[56] References Cited
UNITED STATES PATENTS

| | | | |
|---|---|---|---|
| 3,692,726 | 9/1972 | Oehmichen | 260/29.6 TA |
| 3,769,251 | 10/1973 | West et al. | 260/29.6 TA |
| 3,784,498 | 1/1974 | Ceska | 260/29.6 TA |
| 3,875,099 | 4/1975 | Kurth et al. | 260/29.6 TA |

*Primary Examiner*—Winston A. Douglas
*Assistant Examiner*—J. V. Howard

[57] ABSTRACT

An acrylic polymer dispersant useful for preparing pigment dispersions utilized in aqueous acrylic coating compositions; the acrylic polymer is of 1. styrene, an alkyl methacrylate such as methyl methacrylate, isodecyl methacrylate or stearyl methacrylate or a mixture of styrene and an alkyl methacrylate;
2. an alkyl acrylate having 2–12 carbon atoms in the alkyl group; and
3. acrylic acid or methacrylic acid; the acrylic polymer has a glass transition temperature of about −90°C. to 70°C. and a weight average molecular weight of about 500–30,000.

10 Claims, No Drawings

ACRYLIC POLYMER DISPERSANT FOR AQUEOUS ACRYLIC COATING COMPOSITIONS

BACKGROUND OF THE INVENTION

1. Field of the Invention

This invention relates to an acrylic polymer dispersant useful for preparing pigment dispersions for aqueous acrylic coating compositions.

2. Description of the Prior Art

Aqueous acrylic coating compositions are well-known in the art. However, there has been a problem of incorporating pigments into these aqueous compositions, particularly iron oxide pigments which are very difficult to disperse in these aqueous coating compositions. Backhouse et al. U.S. Pat. No. 3,723,151, issued Mar. 27, 1973, is directed to a dispersant containing aromatic groups used for organic liquids but not for aqueous coating compositions. Fuch et al., U.S. Pat. 3,752,688, issued Aug. 14, 1973, is directed to a process for grinding a select group of pigments in an aqueous alkaline medium then the resulting dispersion is used in lacquers and varnishes. British Pat. No. 1,123,303, published Aug. 14, 1968, is directed to dispersants of acrylic imine-modified carboxylic polymers in which the carboxyl groups have been reacted with an alkaline imine. The dispersants disclosed in the art are useful for solvent-based coating compositions rather than aqueous acrylic coating compositions. The art does not provide for a dispersant that can be used with all types of pigments in aqueous acrylic coating compositions.

SUMMARY OF THE INVENTION

An acrylic polymer dispersant useful for preparing pigment dispersions that are used in aqueous acrylic coating compositions consists essentially of about 1. 20–80% by weight of styrene, an alkyl methacrylate which is either methyl methacrylate, isodecyl methacrylate, or stearyl methacrylate or a mixture of styrene and an alkyl methacrylate;
2. 15–55% by weight of an alkyl acrylate that has 2–12 carbon atoms in the alkyl group; and
3. 5–25% by weight of acrylic acid or methacrylic acid; wherein the acrylic polymer has a glass transition temperature of about −90°C. to 70°C. and a weight average molecular weight of about 500–30,000.

DESCRIPTION OF THE INVENTION

The acrylic polymer dispersant of this invention is particularly adapted for use in water-based compositions and is used to prepare pigment dispersions of all types of pigments. These dispersions are easily blended with an aqueous coating composition, in particular an aqueous acrylic coating composition. A wide variety of pigments can be formed into pigment dispersions and in particular pigments which are very difficult to disperse, such as iron oxide pigments, are readily formed into pigment dispersions.

The acrylic polymer dispersant has a glass transition temperature of about −90°C. to 70°C. The acrylic polymer dispersant has a weight average molecular weight of about 500–30,000. The weight average molecular weight is determined by gel permeation chromatography using polystyrene as a standard. Preferably, to form a high quality dispersant which is particularly useful in a two-roll mill dispersing technique which is described hereinafter, the acrylic polymer has a weight average molecular weight of about 4,000–8,000 and has a glass transition temperature of about 10° to 70°C.

The acrylic polymer dispersant contains styrene, an alkyl methacrylate or a mixture of styrene and an alkyl methacrylate. The alkyl methacrylates used are methyl methacrylate, isodecyl methacrylate or stearyl methacrylate.

Typical alkyl acrylates having 2–12 carbon atoms in the alkyl group which can be used to prepare the acrylic polymer dispersant are ethyl acrylate, propyl acrylate, isopropyl acrylate, butyl acrylate, tertiary butyl acrylate, pentyl acrylate, hexyl acrylate, octyl acrylate, nonyl acrylate, decyl acrylate, lauryl acrylate and the like.

More preferred acrylic polymer dispersants contain about 46–62% by weight of the alkyl methacrylate, 28–34% by weight of the alkyl acrylate, and 10–20% by weight of either acrylic acid or methacrylic acid. These particular dispersants form high quality pigment dispersions for use in aqueous acrylic coating compositions.

In particular, these preferred acrylic polymer dispersants can be of one of the following: (1) methyl methacrylate, butyl acrylate and acrylic acid; (2) isodecyl methacrylate, butyl acrylate and acrylic acid; (3) stearyl methacrylate, butyl acrylate and acrylic acid; (4) methyl methacrylate, 2-ethylhexyl acrylate and methacrylic acid.

Another preferred acrylic polymer dispersant which gives a high quality pigment dispersion is of styrene, methyl methacrylate, butyl acrylate and acrylic acid.

The acrylic polymer dispersant is prepared by a conventional polymerization process in which the monomers, solvents, and polymerization initiator are charged into a conventional reaction vessel and heated for about 1–5 hours at about 60°–150°C. to form the polymer.

About 0.1–4% by weight, based on the weight of the monomers used to prepare the acrylic polymer dispersant, of a polymerization catalyst is utilized. Typical catalysts are azo-bis-isobutyronitrile, azo-bis(α, γ-dimethylvaleronitrile, benzoyl peroxide and tertiary butyl peroxypervalate. Chain transfer agents are used to control the molecular weight such as 2-mercaptoethanol, lauryl mercaptan, and the like.

Typical solvents that can be used in the polymerization process are methanol, isopropanol, n-propanol, diacetone alcohol and other alcohols, acetone, acetyl acetone, ethylene glycol monoethylether, ethylene glycol monobutylether, diethylene glycol monobutylether, ethylene glycol monomethylether acetate, and the like. Solvents of limited water solubility can also be used such as methyl ethylketone, ethylene glycol monoethylether acetate and the like. Under some circumstances the acrylic polymer dispersant can be made without the use of a solvent.

In the preparation of a pigment dispersion from the acrylic polymer dispersant, a wide variety of pigments can be utilized. These pigments are dispersed in water with the acrylic polymer dispersant by conventional techniques to form the dispersion. The weight ratio of pigment to acrylic polymer dispersant in the dispersion is about from 1:100 to about 100:10 and the resulting dispersions have a total weight solids content of about 5–80%.

The acrylic polymer dispersant is particularly useful in forming stable dispersions of aluminum flake and other metallic flakes. The flake is mixed with an organic solution of the acrylic dispersant and an amine for about one-half to 4 hours using a high speed mixer. The resulting organic dispersion then can be mixed with water to form an aqueous dispersion or blended with an aqueous dispersion of an acrylic polymer. In either case, the resulting aluminum dispersion is stable and an emission of hydrogen gas does not occur. These dispersions can be added directly to water-based acrylic paints and form a stable paint. Particularly useful acrylic polymer dispersants for metallic flakes are of methyl methacrylate/butyl acrylate/acrylic acid in the following weight ratios of 50/30/20 and 56/34/10.

Conventional high shear wet grinding procedures are also used to form pigment dispersions of the acrylic polymer dispersant. Typical procedures that are used are sand grinding, ball milling, pebble milling, attritor grinding, high shear mixing, and the like. In these procedures the acrylic polymer dispersant, pigment, an amine or ammonium hydroxide and water are charged into the equipment used in the above procedures and ground from about 1–8 hours to form a uniform pigment dispersion in which the dispersed particles have a size of about 0.01–1 micron. The resulting dispersion then can be further diluted with water or an aqueous polymer dispersion or can be added directly to an aqueous acrylic polymer coating composition to form a high quality paint.

For pigments which are particularly difficult to disperse, a two-roll mill technique is used. Typical pigments of this type are transparent iron oxide pigments, red and yellow iron oxide pigments, dioxazine carbazole toners, carbon black, quinacridones, irgazin yellows, and the like. In a typical two-roll mill process, a mixture is prepared from the pigment and a solution of the acrylic polymer dispersant and charged onto a two-roll mill in which one roll is heated to about 75–150°C. and the other roll is at about room temperature or slightly above. The above mixture is milled until the pigment is uniformly dispersed therein, which is usually about 15 minutes to 2 hours. The mixture is then pulverized and then blended with water and an amine or ammonium hydroxide and thoroughly mixed to form a mill base.

Typical pigments that can be formed into pigments dispersion with the acrylic polymer dispersant using one or more of the above methods are as follows: metallic oxides, such as titanium dioxide, zinc oxide, iron oxide, transparent iron oxides; metallic flakes, such as aluminum flake and nickel flake; metal powders; chromates, molybdates, sulfates, metal titanates, such as nickel titanate; extender pigments, such as talc, calcium carbonate and silica; organic pigments, such as lithols, para reds, toluidine, bon, hansa yellows, benzidine yellow, nickel azo yellows, quinacridones, arylides, thioindigolds, indanthrones, phthalocyanines, such as copper phthalocyanine, anthraquinones, xylidides, tetrachloroisoindoliones, and other organic pigments and toners.

Typical basic compounds that can be used to neutralize the acrylic polymer dispersant or to adjust the pH of an aqueous dispersion of the acrylic polymer dispersant to a pH of about 7–10, are as follows: ammonium hydroxide, amines, such as primary amines, secondary amines, tertiary amines, hydroxy amines; typical of these amines are diethylethanolamine, ethanolamine, diethanolamine, triethanolamine, N-methylethanolamine, N-aminoethanolamine, N-methyldiethanolamine, monoisopropanolamine, diisopropanolamine, triisopropanolamine, hydroxyalkylamine, butanolamine, hexanolamine, methyldiethanolamine, N,N-diethylaminoethylamine, ethylene diamine, diethyltriamine, diethylene tetramine, hexamethylene tetramine, triethylamine, and the like.

One particular useful and preferred aqueous thermosetting acrylic coating composition in which pigment dispersions of the acrylic polymer dispersant are used contains the following film-forming constituents:

1. an acrylic polymer of styrene or methyl methacrylate or a mixture of styrene and methyl methacrylate, and an alkyl acrylate or an alkyl methacrylate other than methyl methacrylate, a hydroxyalkyl acrylate or a hydroxyalkyl methacrylate and an $\alpha,\beta$ unsaturated carboxylic acid such as acrylic acid or methacrylic acid in which the polymer had an acid number of about 20–150;

2. a water-soluble or water-dispersible alkylated melamine formaldehyde resin.

Coating compositions prepared with pigment dispersions of the acrylic polymer dispersant are applied by conventional techniques such as spraying, electrostatic spraying, dipping, brushing, and the like to a variety of substrates such as glass, plastic, metal and the like. These coatings are baked or air dried according to conventional procedures. One useful baking cycle comprises a prebake at about 75°–95°C. for about 5–30 minutes and then a bake at about 125°–200°C. to provide a high quality finish. Finishes are about 0.5–5.0 mils thick but generally finishes are used which are about 1–3 mils in thickness.

The above coating compositions can be applied over primed metal substrates without the use of an intermediate sealer coat; however, a sealer coat can be used to provide a finish with excellent adhesion and smoothness. These sealers may be water based or solvent based and one typically useful sealer is disclosed in Rohrbacher, U.S. Pat. No. 3,509,086 issued Apr. 28, 1970. The resulting finishes have a good gloss and an excellent appearance, and are particularly useful for exterior finishes of automobiles and trucks.

The following examples illustrate the invention. The parts and percentages and ratios are on a weight basis unless otherwise specified.

EXAMPLE 1

An acrylic polymer dispersant solution is prepared as follows:

| Portion I | Parts by Weight |
|---|---|
| Methyl methacrylate monomer | 161.304 |
| Butyl acrylate monomer | 179.407 |
| Acrylic acid monomer | 55.516 |
| Isopropanol | 185.985 |
| 2-Mercaptoethanol | 7.989 |
| Portion II | |
| Methyl methacrylate monomer | 134.472 |
| Acrylic acid monomer | 62.585 |
| Isopropanol | 70.514 |
| 2-Mercaptoethanol | 2.980 |
| Azo-bis-isobutyronitrile | 2.246 |
| Total | 862.998 |

Portion I is premixed and charged into a reaction vessel equipped with a thermometer, stirrer, a reflux condenser and a heating mantle. The ingredients are heated to a reflux temperature of about 94°–95°C. with a constant agitation. Portion II is slowly added over a 4-hour period while maintaining the reaction mixture at its reflux temperature. Upon completion of the addition, the reaction mixture is held for one hour at its reflux temperature and then cooled to room temperature and filtered to remove any coagulum. The resulting composition has a polymer solids content of about 70% and the acrylic polymer is of methyl methacrylate/butyl acrylate/acrylic acid in the weight ratio of 50/30/20. The composition has a Brookfield viscosity measured at 25°C. of about 300 poises. The polymer has a weight average molecular weight of about 7500–8500 measured by gel permeation chromatography using styrene as the standard and the polymer has a glass transition temperature of 27°C.

An aluminum flake mill base is prepared by first forming a dispersion and then forming a mill base from this dispersion. The aluminum flake dispersion is prepared as follows:

| Portion I | Parts by Weight |
|---|---|
| Ethylene glycol monomethylether | 196.8 |
| Diethylethanolamine | 74.1 |
| Portion II | |
| Acrylic polymer dispersant solution (prepared above) | 280.0 |
| Portion III | |
| Aluminum flake paste (65% aluminum flake in mineral spirits) | 449.1 |
| Total | 1000.0 |

Portion I is charged into a mixing vessel and mixed for 10 minutes; Portion II is added and mixed for 30 minutes and then Portion III is added and mixed for 3 hours. An aluminum flake dispersion is formed. The mill base is then formed as follows:

| Portion I | Parts by Weight |
|---|---|
| Aqueous acrylic polymer composition (An aqueous composition containing 35% polymer solids in which the polymer is methyl methacrylate/ butyl acrylate/hydroxyethyl acrylate/acrylic acid in a weight ratio of 54/34/6/6 having a number average molecular weight of about 20,000 determined by gel permeation chromatography using polystyrene as a standard and having 80% of the carboxyl groups neutralized with diethylethanolamine) | 691.76 |
| Deionized water | 80.60 |
| Portion II | |
| Aluminum flake dispersion (prepared above) | 103.64 |
| Total | 876.00 |

Portion I is charged into a mixing vessel and mixed for 10 minutes and then Portion II is added with mixing and then mixed for 30 minutes. An aluminum flake mill base is formed having a solids content of about 34.5% and a pigment to binder weight ratio of about 11.13/100. The binder refers to film-forming constituents in the mill base.

A neutralized acrylic polymer dispersant solution is prepared as follows:

| | Parts by Weight |
|---|---|
| Acrylic polymer dispersant solution (prepared above) | 100.0 |
| Diethylethanolamine | 22.8 |
| Deionized water | 11.2 |
| Total | 134.0 |

The above ingredients are thoroughly mixed together.

A blue pigment mill base is prepared as follows:

| Portion I | Parts by Weight |
|---|---|
| Deionized water | 38.74 |
| Neutralized acrylic polymer dispersant solution (prepared above) | 17.26 |
| Portion II | |
| Copper phthalocyanine blue pigment | 29.00 |
| Portion III | |
| Deionized water | 15.00 |
| Total | 100.00 |

Portion I is charged into a mixing vessel and mixed for 15 minutes and then charged into a convention ball mill with Portion II and ground for 50,000 cycles to form a uniform dispersion. The dispersion is removed from the ball mill and mixed with Portion III to form a mill base having a pigment to binder ratio of about 336/100.

An indoviolet mill base is prepared as follows:

| | Parts by Weight |
|---|---|
| Indofast violet blue toner (Dioxazine carbazole toner) | 50.00 |
| Acrylic polymer dispersant solution (prepared above) | 71.40 |
| Total | 121.40 |

The above ingredients are blended together and then charged onto a two-roll mill that has one roll heated at about 120°C. and the second roll at about 21°C. and milled until any solvents present have evaporated which takes place in about 30 minutes. About 32 parts by weight of the resulting composition are charged into a ball mill with about 62.9 parts by weight of water and 5.1 parts by weight of diethylethanolamine and ground for 10,000 cycles to form a mill base having a pigment to binder ratio of about 100/100.

A water-based paint is prepared as follows:

| Portion I | Parts by Weight |
|---|---|
| Aqueous acrylic polymer composition (described above) | 147.00 |
| Hexamethoxymethylmelamine | 30.00 |
| Portion II | |
| Aluminum flake mill base (prepared above) | 60.57 |
| Blue pigment mill base | |

|  | | Parts by Weight |
|---|---|---|
| (prepared above) | | 0.86 |
| Indo violet mill base (prepared above) | | 0.02 |
| | Total | 238.45 |

Portion I is charged into a mixing vessel and thoroughly blended. The mill bases in Portion II are then added in the order shown and thoroughly blended into the composition giving a paint of a uniform consistency and having a pH of about 7.2–8.0 and a pigment to binder ratio of about 2.4/100.

The paint is reduced to a No. 2 cup Zahn viscosity of 25–35 seconds by the addition of deionized water.

The reduced paint is then sprayed onto primed steel panels and the panels are prebaked at about 82°C. for 30 minutes and then baked at 163°C. for 30 minutes. The resulting coating is about 2 mils thick, has an excellent appearance, good gloss, good adhesion to the substrate, and good durability and weatherability.

EXAMPLE 2

An acrylic polymer dispersant solution is prepared as follows:

| Portion I | Parts by Weight |
|---|---|
| Isodecyl methacrylate monomer | 303.8 |
| Butyl acrylate monomer | 342.6 |
| Acrylic acid monomer | 107.6 |
| Isopropanol | 355.2 |
| 2-Mercaptoethanol | 20.0 |
| Portion II | |
| Isodecyl methacrylate monomer | 264.6 |
| Acrylic acid monomer | 119.6 |
| Isopropanol | 463.2 |
| Azo-bis-isobutyronitrile | 6.5 |
| Total | 1983.1 |

Portion I is premixed and charged into a reaction vessel equipped with a stirrer, reflux condenser, an addition funnel and a heating mantle. The constituents are heated to its reflex temperature and then Portion II is premixed and added at a uniform rate over the next 3 hours while maintaining the resulting reaction mixture at its reflux temperature. After Portion II is added, the reaction mixture is held at its reflux temperature for an additional hour and then cooled to room temperature. The resulting composition has a polymer solids content of about 56% and the polymer is of isodecyl methacrylate/butyl acrylate/acrylic acid in a weight ratio of 50/30/20. The polymer has a weight average molecular weight of about 7500–8500 measured as in Example 1 and a calculated glass transition temperature of −45°C.

A neutralized acrylic polymer dispersant solution is prepared by thoroughly blending together the following ingredients:

| | Parts by Weight |
|---|---|
| Acrylic polymer dispersant solution (prepared above) | 100.0 |
| Diethylethanolamine | 22.8 |
| Deionized water | 17.2 |

| | | Parts by Weight |
|---|---|---|
| | Total | 140.0 |

A white mill base is prepared as follows:

| | Parts by Weight |
|---|---|
| Deionized water | 26.00 |
| Neutralized acrylic polymer dispersant solution | 14.00 |
| Titanium dioxide pigment | 131.00 |
| Total | 171.00 |

The above constituents are mixed together and then charged into a conventional 8 gallon sand mill and ground 1 pass at a rate of 25 gallons per hour. The resulting white mill base has a pigment to binder ratio of about 857/100.

The above mill base can be formulated into a water-based paint composition as in Example 1, provided that an acrylic polymer is used that is compatible with the acrylic polymer dispersant. It is expected that high quality finishes could be formed from such a paint.

EXAMPLE 3

An acrylic polymer dispersant solution is prepared as follows:

| Portion I | Parts by Weight |
|---|---|
| Stearyl methacrylate monomer | 303.8 |
| Butyl acrylate monomer | 342.6 |
| Acrylic acid monomer | 107.6 |
| Isopropanol | 355.2 |
| 2-Mercaptoethanol | 20.0 |
| Portion II | |
| Stearyl methacrylate monomer | 264.6 |
| Acrylic acid monomer | 119.6 |
| Isopropanol | 463.3 |
| Azo-bis-isobutyronitrile | 6.5 |
| Total | 1983.2 |

Portion I is premixed and charged into a reaction vessel equipped with a stirrer, a reflux condenser, an additional funnel and a heating mantle and Portion I is heated to its reflux temperature. Portion II is premixed and added at a uniform rate over a 3-hour period while maintaining the resulting reaction mixture at its reflux temperature. After Portion II is added, the reaction mixture is held for another 45 minutes at its reflux temperature and then the reaction mixture is cooled.

The resulting reaction mixture has a 56.8% polymer solids content and the polymer is of stearyl methacrylate/butyl acrylate/acrylic acid in a weight ratio of 50/30/20 and the polymer has weight average molecular weight of about 7500–8500 measured as in Example 1 and a calculated glass transition temperature of −65°C.

A neutralized acrylic polymer dispersant solution is prepared by thoroughly blending together the following ingredients:

| | Parts by Weight |
|---|---|
| Acrylic polymer dispersant solution (prepared above) | 100.0 |
| Diethylethanolamine | 22.8 |
| Deionized Water | 17.2 |
| Total | 140.0 |

A white mill base is prepared as follows:

| | Parts by Weight |
|---|---|
| Deionized water | 26.00 |
| Neutralized acrylic polymer dispersant solution | 14.00 |
| Titanium dioxide pigment | 131.00 |
| Total | 171.00 |

The above constituents are mixed together and then charged into a conventional 8 gallon sand mill and ground 1 pass at a rate of 25 gallons per hour. The resulting white mill base has a pigment to binder ratio of about 857/100.

The above mill base can be formulated into a water-based paint composition as in Example 1, provided that an acrylic polymer is used that is compatible with the acrylic polymer dispersant. It is expected that high quality finishes could be formed from such a paint.

EXAMPLE 4

An acrylic polymer dispersant solution is prepared as follows:

| Portion I | Parts by Weight |
|---|---|
| Styrene monomer | 8.956 |
| Methyl methacrylate monomer | 14.854 |
| n-Butyl acrylate monomer | 34.825 |
| Acrylic acid monomer | 3.672 |
| Methanol | 3.274 |
| Diethylene glycol monobutyl ether | 29.433 |
| 2-Mercaptoethanol | 0.432 |
| Benzoyl peroxide | 0.001 |
| Portion II | |
| Styrene monomer | 20.894 |
| Methyl methacrylate monomer | 10.519 |
| Acrylic acid monomer | 6.279 |
| Diethylene glycol monobutyl ether | 7.363 |
| Methanol | 0.816 |
| 2-Mercaptoethanol | 0.746 |
| Benzoyl peroxide | 3.184 |
| Total | 145.248 |

Portion I is premixed and charged into a reaction vessel equipped with a stirrer, a reflux condenser, an addition funnel and a heating mantle and Portion I is heated to its reflux temperature. Portion II is premixed and added at a uniform rate over a 3-hour period while maintaining the resulting reaction mixture at its reflux temperature. After Portion II is added, the reaction mixture is held for another 60 minutes at its reflux temperature and then the reaction mixture is cooled.

The resulting reaction mixture has about a 70% polymer solids content and the polymer is of styrene/methyl methacrylate/butyl acrylate/acrylic acid in a weight ratio of about 30/25/35/10 and the polymer has weight average molecular weight of about 7500–8500 measured as in Example 1 and a glass transition temperature of about 25° to 26°C.

A neutralized acrylic polymer dispersant solution is prepared by thoroughly blending together the following ingredients:

| | Parts by Weight |
|---|---|
| Acrylic polymer dispersant solution (prepared above) | 100.0 |
| Diethylethanolamine | 22.8 |
| Deionized water | 17.2 |
| Total | 140.0 |

A white mill base is prepared as follows:

| | Parts by Weight |
|---|---|
| Deionized water | 26.00 |
| Neutralized acrylic polymer dispersant solution | 14.00 |
| Titanium dioxide pigment | 131.00 |
| Total | 171.00 |

The above constituents are mixed together and then charged into a conventional 8 gallon sand mill and ground 1 pass at a rate of 25 gallons per hour. The resulting white mill base has a pigment to binder ratio of about 857/100.

A water-based paint is prepared as follows:

| | Parts by Weight |
|---|---|
| Aqueous acrylic polymer composition (described in Example 1) | 200.00 |
| White mill base (prepared above) | 95.00 |
| Hexamethoxymethyl melamine | 30.00 |
| Total | 325.00 |

The above ingredients are thoroughly mixed together giving a paint of uniform consistency and a pigment to binder ratio of about 57/100.

The paint is reduced to a No. 2 Zahn cup viscosity of 25–35 seconds with water and the reduced paint is sprayed onto suitably primed steel panels and the panels are baked as in Example 1. The resulting coating is about 2 mils thick and has an excellent appearance, good gloss and good adhesion to the substrate.

EXAMPLE 5

An acrylic polymer dispersant solution is prepared as follows:

| Portion I | Parts by Weight |
|---|---|
| Methyl methacrylate monomer | 147.6 |
| 2-Ethylhexyl acrylate monomer | 638.9 |
| Methacrylic acid monomer | 88.7 |
| Isopropanol | 374.9 |
| 2-Mercaptoethanol | 15.7 |
| Portion II | |
| Isopropanol | 309.4 |
| Acetone | 77.3 |
| Azo-bis-isobutyronitrile | 19.3 |

-continued

| Portion III | |
|---|---|
| Methyl methacrylate monomer | 116.4 |
| Methacrylic acid monomer | 210.5 |
| 2-Mercaptoethanol | 1.2 |
| Total | 1999.9 |

Portion I is premixed and charged into a reaction vessel equipped with a stirrer, a reflux condenser, an addition funnel and a heating mantle. The ingredients are heated to their reflux temperature. Portion II is premixed and Portion III is premixed. Portions II and III are added separately to the reaction vessel while maintaining the resulting reaction mixture at its reflux temperature. The simultaneous addition of Portions II and III are continuously added at a uniform rate over about a 4-hour period. The resulting composition has a polymer solids content of 70% and is a polymer of a methyl methacrylate/2-ethylhexyl-acrylate/methacrylic acid in a weight ratio of 22/53/25 and the polymer has a weight average molecular weight of about 7500–8500 measured as in Example 1 and a calculated glass transition temperature of 25°C.

A neutralized acrylic polymer dispersant solution is prepared by thoroughly blending together the following ingredients:

| | Parts by Weight |
|---|---|
| Acrylic polymer dispersant solution (prepared above) | 100.0 |
| Ammonium hydroxide solution (aqueous solution containing 28% ammonia) | 12.3 |
| Deionized water | 27.7 |
| Total | 140.00 |

A white mill base is prepared as follows:

| | Parts by Weight |
|---|---|
| Neutralized acrylic polymer dispersant solution | 14.00 |
| Deionized water | 26.00 |
| Titanium dioxide pigment | 60.00 |
| Total | 100.00 |

The above ingredients are premixed and then charged into a conventional 8 gallon sand mill and ground 1 pass at a rate of 25 gallons per hour and then filtered to remove any grit.

A talc mill base is prepared as follows:

| | Parts by Weight |
|---|---|
| Neutralized acrylic polymer dispersant solution | 14.00 |
| Deionized water | 26.00 |
| Talc (finely divided) | 60.00 |
| Total | 100.00 |

The above ingredients are premixed and ground as above and then filtered.

A mica mill base is prepared as follows:

| | Parts by Weight |
|---|---|
| Neutralized acrylic dispersant solution | 14.00 |
| Deionized water | 26.00 |
| Mica (finely divided) | 60.00 |
| Total | 100.00 |

The above ingredients are premixed and ground as above and then filtered.

A white latex paint is prepared as follows:

| | Parts by Weight |
|---|---|
| Aqueous latex (52% solids of a polymer dispersed in water in which the polymer is methylmethacrylate/2-ethylhexyl-acrylate/methacrylic acid in a weight ratio of 45/53/2 and containing sufficient ammonium hydroxide to provide a pH of about 9) | 41.9 |
| Deionized water | 14.8 |
| White mill base (prepared above) | 26.9 |
| Talc mill base (prepared above) | 8.2 |
| Mica mill base (prepared above) | 8.2 |
| Total | 100.0 |

The above ingredients are thoroughly blended together to form a white latex paint having a solids content of about 55% and a pigment to binder ratio of about 153/100. The paint is brushed onto a suitably primed wood substrate and dried at room temperature for about 1 hour. The resulting finish had a good appearance and excellent adhesion to the substrate.

EXAMPLE 6

An acrylic polymer dispersant solution is prepared as follows:

| Portion I | Parts by Weight |
|---|---|
| Methyl methacrylate monomer | 640.3 |
| Butyl acrylate monomer | 714.8 |
| Acrylic acid monomer | 95.5 |
| Diethylene glycol monobutyl ether | 588.0 |
| Methanol | 65.4 |
| 2-Mercaptoethanol | 29.4 |
| Portion II | |
| Methyl methacrylate monomer | 529.8 |
| Acrylic acid monomer | 113.2 |
| Diethylene glycol monobutyl ether | 162.2 |
| Methanol | 18.0 |
| 2-Mercaptoethanol | 7.3 |
| Benzoyl peroxide | 17.6 |
| Total | 2981.5 |

Portion I is premixed and charged into a reaction vessel equipped with a stirrer, a reflux condenser, an addition funnel and a heating mantle and Portion I is heated to its reflux temperature. Portion II is premixed and added at a uniform rate over a 3-hour period while maintaining the resulting reaction mixture at its reflux temperature. After Portion II is added, the reaction mixture is held for another 60 minutes at its reflux temperature and then the reaction mixture is cooled.

The resulting reaction mixture has about a 70% polymer solid content and the polymer is methyl methacrylate/butyl acrylate/acrylic acid in a weight ratio of 56/34/10 and the polymer has weight average molecular weight of about 7500–8500 measured as in Example 1 and a glass transition temperature of about 25° to 28°C.

A neutralized acrylic polymer dispersant solution is prepared by thoroughly blending together the following ingredients:

|  | Parts by Weight |
|---|---|
| Acrylic polymer dispersant solution (prepared above) | 100.0 |
| Diethylethanolamine | 22.8 |
| Deionized water | 17.2 |
| Total | 140.0 |

A transparent red iron oxide mill base is prepared as follows:

|  | Parts by Weight |
|---|---|
| Transparent red iron oxide pigment | 51.20 |
| Acrylic polymer dispersant solution (prepared above) | 48.80 |
| Total | 100.00 |

The above ingredients are blended together and then charged onto a two-roll mill that has one roll heated to about 120°C. and the other roll heated to about 21°C. The ingredients are milled until the resulting mixture transfers from the cold roll to the hot roll and then the mixture is milled for an additional 30 minutes. The mixture is then removed and pulverized to form pigment chips. The mill base is then prepared by thoroughly blending together the following:

|  | Parts by Weight |
|---|---|
| Pigment chips (prepared above) | 40.0 |
| Diethylethanolamine | 2.6 |
| Deionized water | 57.4 |
| Total | 100.0 |

A black mill base is prepared as follows:

| Portion I | Parts by Weight |
|---|---|
| Neutralized acrylic polymer dispersant solution (sufficient diethylethanolamine is added to the above prepared dispersant solution to neutralize all of the carboxyl groups of the acrylic polymer.) | 14.50 |
| Deionized water | 30.30 |
| Carbon black pigment | 24.90 |
| Portion II |  |
| Deionized water | 30.30 |
| Total | 100.00 |

Portion I is charged into an attritor containing ⅛-inch steel balls and ground for 30 minutes at 2000 revolutions per minute. Portion II is added and the resulting composition is ground for an additional 30 minutes. A carbon black mill base is formed having the carbon black pigment uniformily dispersed therein.

A copper phthalocyanine green mill base is prepared as follows:

| Portion I | Parts by Weight |
|---|---|
| Deionized water | 28.34 |
| Neutralized acrylic polymer dispersant solution (described above) | 19.04 |
| Copper phthalocyanine green pigment | 38.62 |
| Portion II |  |
| Deionized water | 14.00 |
| Total | 100.00 |

Portion I is charged into a ball mill and ground for 60,000 cycles and then removed from the mill. Portion II is then added and thoroughly mixed with Portion I to form a green mill base.

An aqueous dark brown metallic paint is prepared as follows:

|  | Parts by Weight |
|---|---|
| Aqueous acrylic polymer composition (described in Example 1) | 200.0 |
| Hexamethoxymethyl melamine | 30.0 |
| Transparent red iron oxide mill base (prepared above) | 13.9 |
| Black mill base (prepared above) | 4.2 |
| Copper phthalocyanine green mill base (prepared above) | 0.8 |
| Aluminum flake mill base (prepared in Example 1) | 2.1 |
| Total | 251.0 |

The above constituents are thoroughly mixed together to form a paint having a pigment to binder ratio of about 5.4/100. Following the procedure of Example 1, the paint is diluted with water to a spray viscosity, sprayed onto suitably primed steel panels and baked. The resulting coatings are about 2 mils thick and have an excellent appearance, good gloss, good metallic glamour, good adhesion to the substrate and good durability and weatherability.

The invention claimed is:
1. An acrylic polymer dispersant for dispersing pigments in aqueous acrylic paints consisting essentially of about
   1. 46–62% by weight, based on the weight of acrylic polymer, of constituents selected from the group consisting of styrene, an alkyl methacrylate or a mixture of styrene and an alkyl methacrylate; wherein the alkyl methacrylate is selected from the group consisting of methyl methacrylate, isodecyl methacrylate or stearyl methacrylate;
   2. 28–34% by weight, based on the weight of the acrylic polymer, of an alkyl acrylate having 2–12 carbon atoms in the alkyl group; and
   3. 10–20% by weight, based on the weight of the acrylic polymer, of acrylic acid or methacrylic acid; and wherein the acrylic polymer has a glass transition temperature of about −90°C to 70°C and a weight average molecular weight of about 500–30,000.

2. The acrylic polymer dispersant of claim 1 in which the acrylic polymer consists essentially of
   1. methyl methacrylate;
   2. an alkyl acrylate; and
   3. acrylic acid or methacrylic acid; and wherein the acrylic polymer has weight average molecular weight of about 4,000–8,000 and a glass transition temperature of about 10° to 70°C.

3. The acrylic polymer dispersant of claim 2 in which the acrylic polymer consists essentially of methyl methacrylate, butyl acrylate and acrylic acid.

4. The acrylic polymer dispersant of claim 2 in which the acrylic polymer consists essentially of isodecyl methacrylate, butyl acrylate and acrylic acid.

5. The acrylic polymer dispersant of claim 2 in which the acrylic polymer consists essentially of stearyl methacrylate, butyl acrylate and acrylic acid.

6. The acrylic polymer dispersant of claim 1 in which the acrylic polymer consists essentially of styrene, methyl methacrylate, butyl acrylate and acrylic acid.

7. A dispersion having a 5–80% solids content of an acrylic polymer dispersant of claim 1 and pigments in an organic medium; wherein the weight ratio of pigment to dispersant is about 1:100 to about 100:10.

8. The dispersion of claim 7 in which the pigment is iron oxide.

9. An aqueous dispersion having a 5–80% solids content of an acrylic polymer dispersant of claim 1 and pigments uniformly dispersed in an aqueous medium and containing sufficient amount of an organic basic compound or ammonia to provide a pH of about 7–10; wherein the pigment to dispersant weight ratio is about 1:100 to about 100:10.

10. In an aqueous paint composition of an acrylic film-forming polymer and a water dispersible crosslinking agent, the improvement used therewith consists essentially of
   1–50% by weight, based on the weight of the paint composition, of an acrylic polymer dispersant consisting essentially of about
   1. 46–62% by weight, based on the weight of the acrylic polymer of methyl methacrylate;
   2. 28–34% by weight, based on the weight of the acrylic polymer, of butyl acrylate; and
   3. 10–20% by weight, based on the weight of the acrylic polymer of acrylic acid;

wherein the paint composition contains sufficient ammonium hydroxide or amine to provide a pH of about 7–10.

* * * * *